US011229998B2

(12) United States Patent
Syverson

(10) Patent No.: US 11,229,998 B2
(45) Date of Patent: Jan. 25, 2022

(54) STRESS SEVER DEVICE FOR TECH NECK SYNDROME

(71) Applicant: Atiya Syverson, Katy, TX (US)

(72) Inventor: Atiya Syverson, Katy, TX (US)

( * ) Notice: Subject to any disclaimer, the term of this patent is extended or adjusted under 35 U.S.C. 154(b) by 9 days.

(21) Appl. No.: 16/502,007

(22) Filed: Jul. 2, 2019

(65) Prior Publication Data

US 2021/0001468 A1 Jan. 7, 2021

(51) Int. Cl.
*B25G 1/06* (2006.01)
*F16M 13/04* (2006.01)
(52) U.S. Cl.
CPC ............... *B25G 1/06* (2013.01); *F16M 13/04* (2013.01); *A45F 2200/0516* (2013.01)
(58) Field of Classification Search
CPC ... F16M 13/04; A45F 2200/0516; B25G 1/04; B25G 1/06
See application file for complete search history.

(56) References Cited

U.S. PATENT DOCUMENTS

| 9,103,491 | B2* | 8/2015 | Mak | F16M 13/04 |
| 9,723,910 | B2* | 8/2017 | Due | A45F 5/10 |
| 10,441,066 | B2* | 10/2019 | Robinson | A45F 5/02 |
| 2015/0029352 | A1* | 1/2015 | Burciaga | H04M 1/04 348/211.99 |
| 2017/0293207 | A1* | 10/2017 | Jeon | F16M 11/32 |
| 2018/0116383 | A1* | 5/2018 | McGahey | H04M 1/05 |
| 2018/0359346 | A1* | 12/2018 | Chen | F16M 11/105 |

\* cited by examiner

*Primary Examiner* — Dean J Kramer
(74) *Attorney, Agent, or Firm* — Delphine James

(57) ABSTRACT

A stress saver support device includes a rechargeable/extendable wand that rotates 360 degrees relative to a supporting base which is attached to a swivel joint attached to the backside of the portable device. The lower edge of the wand is hingedly connected to the supporting base to allow the portable device to be properly positioned for viewing by the user.

8 Claims, 13 Drawing Sheets

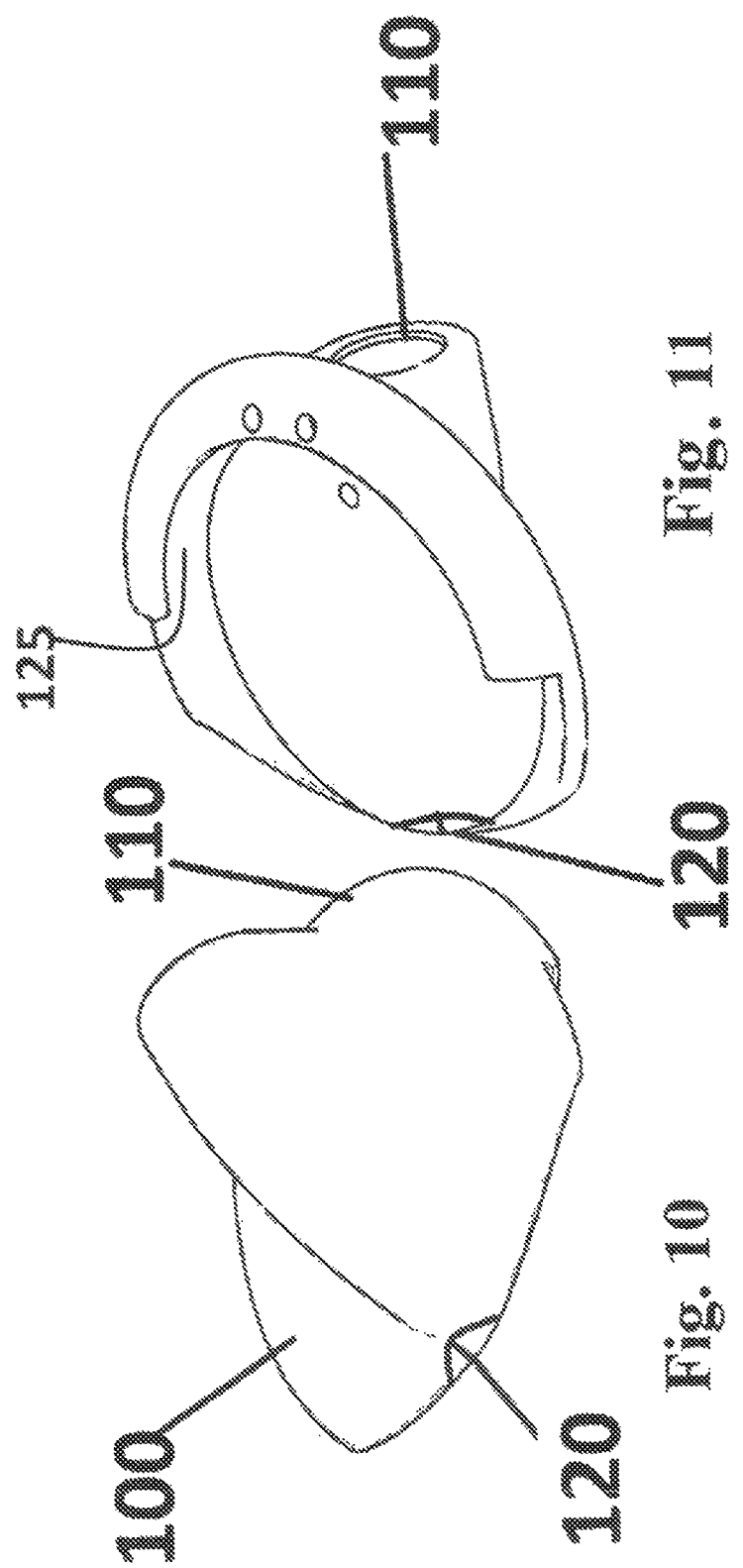

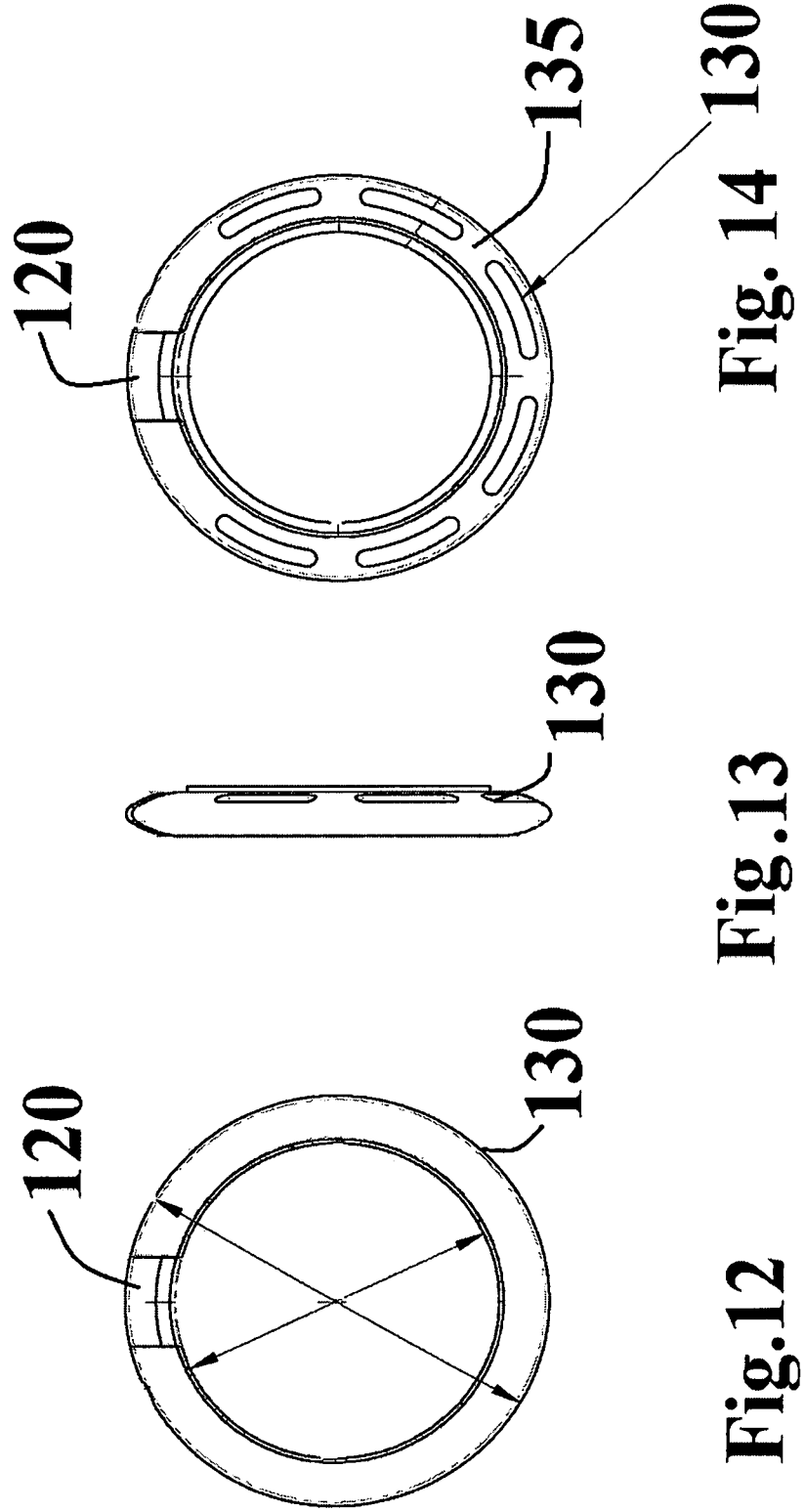

STRESS SEVER DEVICE FOR TECH NECK SYNDROME

NON-PROVISIONAL PATENT

This patent claims the benefit of provisional patent 62/692,871.

BACKGROUND

The present invention relates to a device that is designed to solve the evolving health issue called Text Neck or Tech Neck. Tech or Text Neck is an overuse syndrome or a repetitive stress/strain injury to the neck caused by holding the head forward and in a downward position for extended periods of time in order to view a hand held electronic device such as a smart phone. When the user holds his/her head in this position the neck muscles, tendons and ligaments are strained from the weight of the head and the posture that compresses nerves and the discs of the spine. The overuse of the muscles, etc. can result in acute pain and chronic pain and spinal injury.

Using a mobile device at chest to waist range results in the user bending their neck to view the screen. In addition, the user tends to bend forward which can reduce respiratory capacity. The user holds the device with two hands and tends to text with the thumbs which contributes to Texting Thumb.

In addition, without using the device, the user has to hold the phone which puts strain on the fingers as the user tries to hold/support the phone with the fingers which places the fingers and hand in a poor posture while gripping the device which adds to the stress and strain of using the device.

SUMMARY OF THE INVENTION

One of the major objectives of the present invention is to reduce the stress on your neck by reducing the bending of neck while using your cellular device and or tablets. When the user holds his/her head in this position the neck muscles, tendons and ligaments are strained from the weight of the head and the posture that compresses nerves and the discs of the spine. The overuse of the muscles, etc. can result in acute pain and chronic pain and spinal injury.

While the disclosure provides certain specific embodiments, the invention is not limited to those embodiments. A person of ordinary skill will appreciate from the description herein that modifications can be made to the described embodiments and therefore that the specification is broader in scope than the described embodiments. All examples are therefore non-limiting.

BRIEF DESCRIPTION OF DRAWINGS

These and other details of the present invention will be described in connection with the accompany drawings, which are not furnished only by way of illustration and not in limitation of the invention.

FIG. 10 cutaway illustrates top view of the wand holder

FIG. 11 illustrates cutaway button view of wand holder

FIG. 12 illustrates cutaway top view of the ring

FIG. 13 illustrates cutaway side view of the ring

FIG. 14 illustrates cutaway bottom view of the ring with end cap

DETAILED DESCRIPTION OF THE INVENTION

Hereinafter, an embodiment of the present invention will be described in detail with reference to the accompanying drawings. However, the present invention is not limited to the embodiment to be described below but may be implemented in various different embodiments. The embodiment is merely provided to completely disclose the present invention and completely inform those skilled in the art of the spirit of the present invention.

The positioning of device reduces the stress on the neck by reducing bending of the neck. When the neck is straight, the neck is supporting approximately 8-12 lbs. When the neck is bent, the weight of the head increases approximately 10 lbs. for every inch of forward bend. So, when the neck bends forward 1", the neck must support approximately 22 lbs., when bending forward 2", the neck must support approx. 32 lbs, etc.

When considering the angle of the head when compared to vertical, at 0°, the head weight is approx. 12 lbs. At 15°, the head weight goes up to 27 lbs., at 30°, the head weight is 40 lbs., at 60°, the head weight can be as high as 60 lbs. As stated above, the device of the present invention reduces the bending of then neck.

Medical professionals and ergonomists are recommending holding the device at approximately shoulder level to reduce neck deviation and Text/Tech Neck. However, this elevated, static posture causes muscle fatigue and places stress on the shoulders and upper back. This shifts the stress and strain from the neck to the shoulders and upper back, thus shifting the stress to other body parts.

Since the handle of the Tecneksavr allows the user to hold it in a "power grip", it reduces the stress and strain on the fingers and thumbs. The user can vary which hand they use to hold the device and vary the fingers used to text and use phone apps and functions. Varying finger use can reduce elbow pain and help prevent/reduce the likelihood of Texting Thumb.

The user holds the Techneksavr with the elbow close to the torso, with the shoulders in a neutral position WHILE reducing the bend in the torso and neck. This will avoid shifting the neck stress to the shoulders, prevent acid reflux and avoid adversely affecting respiratory capacity.

The Tecneksavr is expected to reduce stress and strain to the neck, upper back, shoulders, lower back, elbows, fingers, thumbs, etc.

As shown in 1,2,4, and 5 the present invention is to be used in combination with a comprises the following elements: (a) telescoping wand (b) wand base (c) swivel assembly and (d) a connector member.

Figure 1:
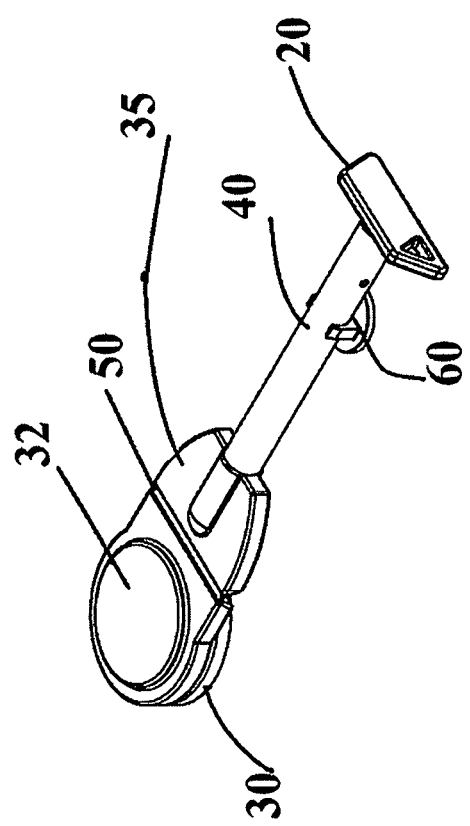
FIG. 1 illustrates a top perspective view of one embodiment of the present
Figure 2:
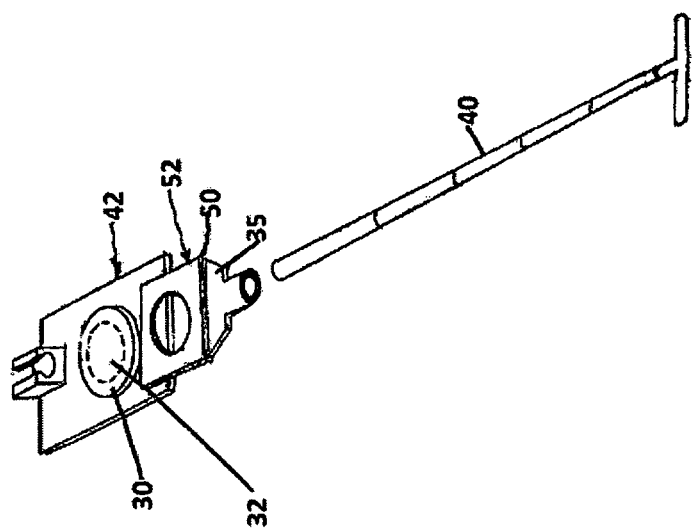
FIG. 2 illustrates a top perspective view of an alternative embodiment of the present
Figure 3:
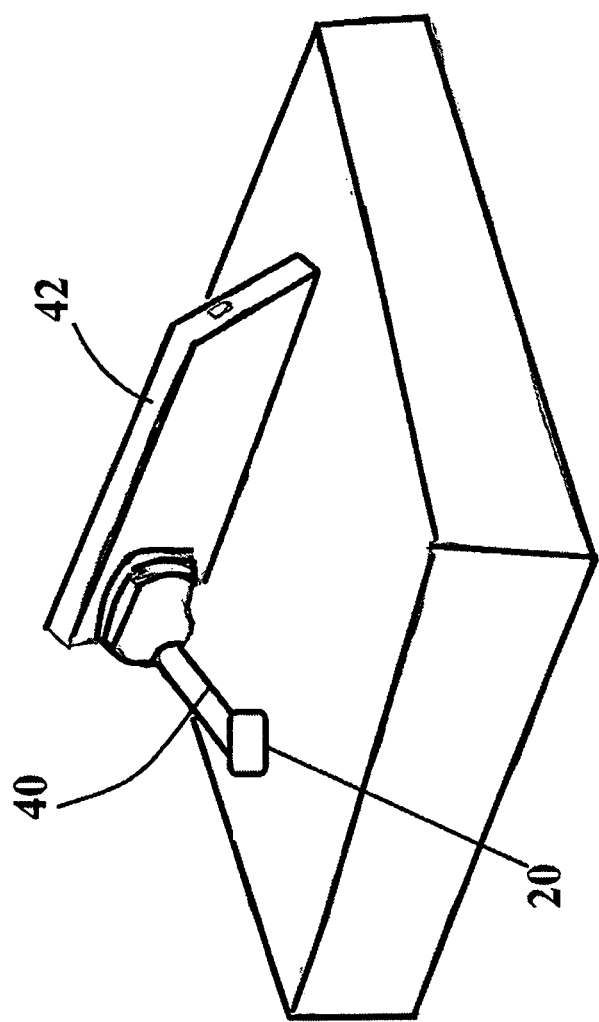
FIG. 3 illustrates present Invention attached to phone sitting on Table Top
Figure 4:
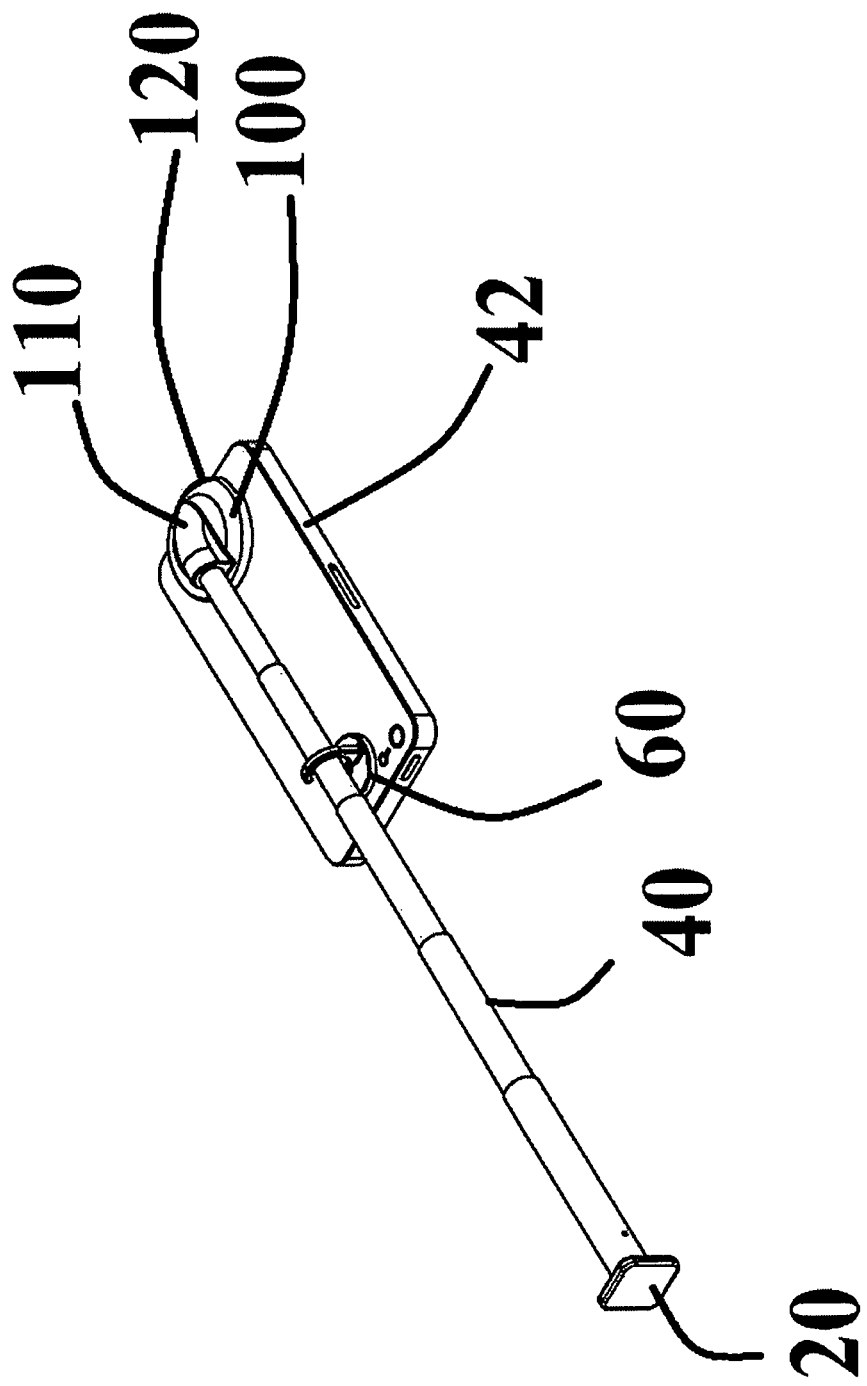
FIG. 4 illustrates alternative embodiment of the present Invention attached to phone
Figure 5:
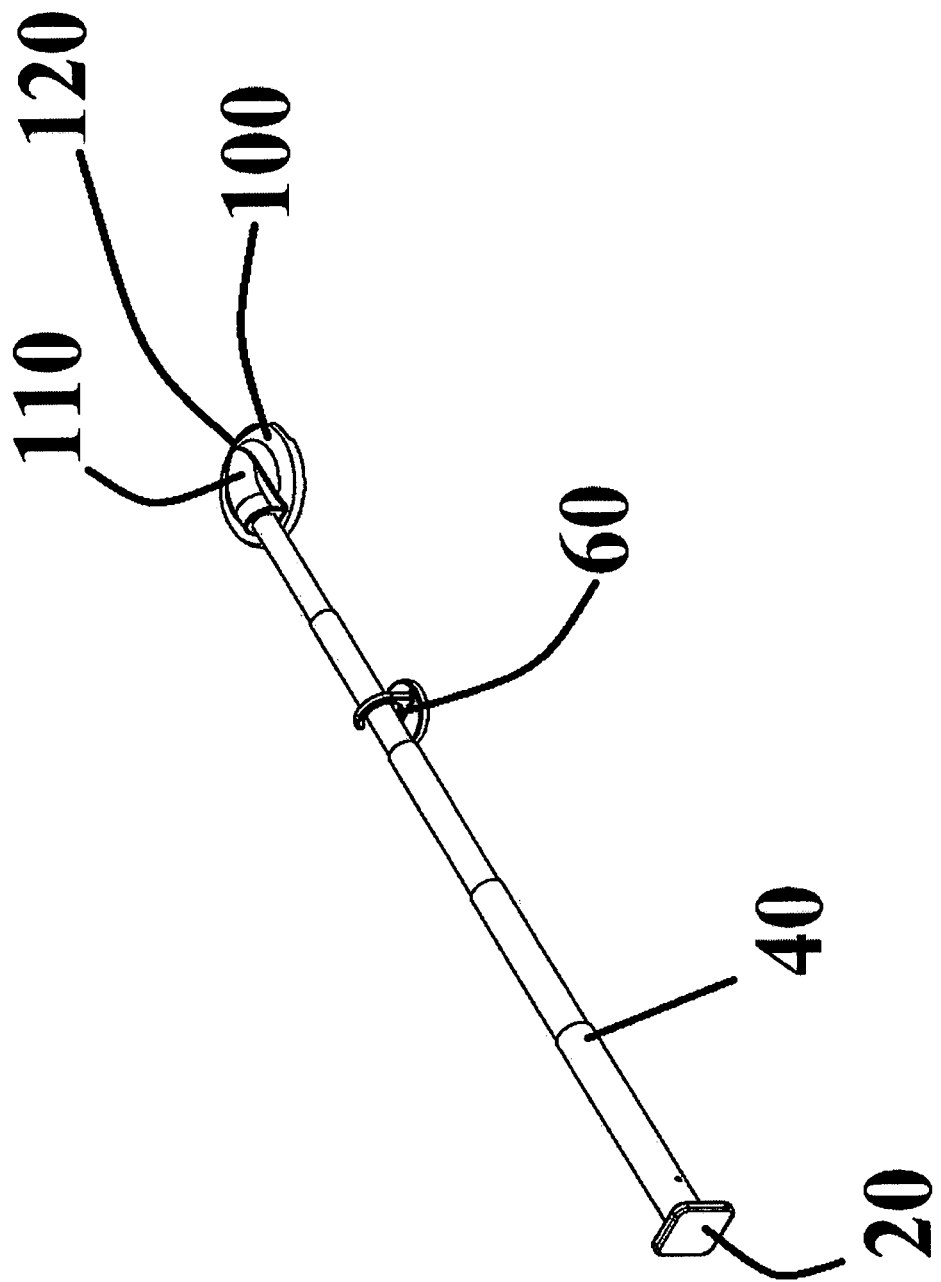
FIG. 5 illustrates alternative embodiment of present invention
Figure 6:
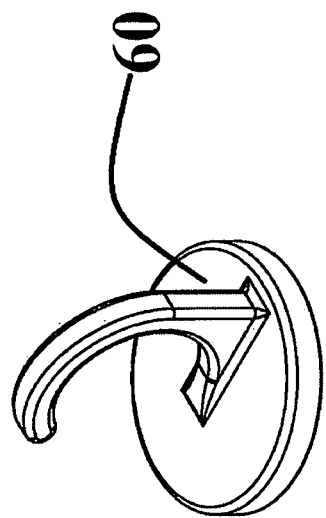
FIG. 6 illustrates cutaway view of connector for telescoping wand
Figure 7:
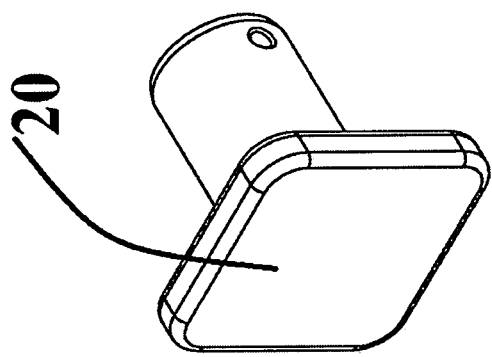
FIG. 7 illustrates a cutaway view of the cap attached to the end of the wand
Figure 8:
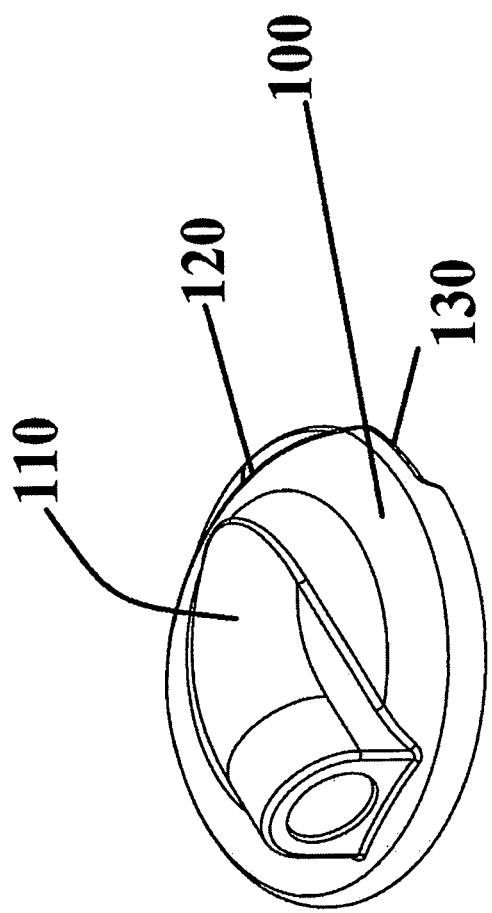
FIG. 8 illustrates the holder of the upper end of the wand.

Referring to the alternative embodiment in FIG. 2, the wand base (52) is a flat plate with a pre-defined depth defined by a top-side, a rear edge, a front edge and a pair of opposing side edges. The flat plate of the wand base (52) further comprises a centrally disposed aperture. The base (42) and wand base (52) in this embodiment has a rectangular polygonal shape. As depicted in FIG. 2, the base (42) and the wand base (52) have the same complementary structure. However alternative polygonal shapes, circle, oval or elliptical shapes can be utilized. The swivel assembly (30) further comprises a centrally mounted spring biased joint member (32) that protrudes linearly upward from the base (42). As shown the spring biased joint member (32), have a diameter substantially equivalent to the aperture in the wand base (52) to allow a swivel connection as shown in FIG. 1. FIG. 2 wand 40 attaches to joint member (35) that connects to wand base (52) through hinged connection (50). As depicted in FIG. 1 wand (40) is held in place by clip (60).

As shown in FIGS. 1,2,4, and 5, the device in this embodiment includes telescopic/rotatable wand (40) and a double circle (30) for holding and sticking to a cellular device. Tecneksavr device (10) includes a double sided tape (50) use to stick on the back of a cellular device to hold device in place. Doubled circle (30) is pivotally or rotatable connected to the top end of rotatable wand (40). The rotatable wand (40) comprises a shaft defined by a top end, a bottom end and a lower telescopic section. The top end of the shaft has a hinged connection with the lower end of the disc allowing the shaft to transverse between an inward and outward position. The bottom end of the shaft have a perpendicularly attached bar. In use, the rotatable wand (40) is extended outward in angular position to support a cellular phone in an upright position.

FIGS. 4, 5, 6, 7, 8, 9, 10 11, 12, 13, 14, and 16 illustrate an alternative embodiment of connecting the telescoping wand to the swivel joint. With this embodiment, the swivel joint comprises a cap member (100) disposed atop the ring (130) which has a hinged connection (120) to the base (135) allowing the wand (40) to pivot backward and forward. The cap member (100) has a top wall with surrounding sidewalls. The wand (40) is laterally attached to the top wall of the cap member through opening (110). The cap member (100) has an integrally formed surrounding channel (125) which attaches to the outer peripheral wall of the annular ring (130). The ring connection within the channel (125) allows the wand (40) to rotate 360 degrees relative to the swivel joint. The hinged connection (120) allows the wand (40) to pivot backward and forward relative to the swivel joint. This alternative embodiment of the swivel joint operates the same as the embodiment above except the swivel joint connection is different.

Figure 9:
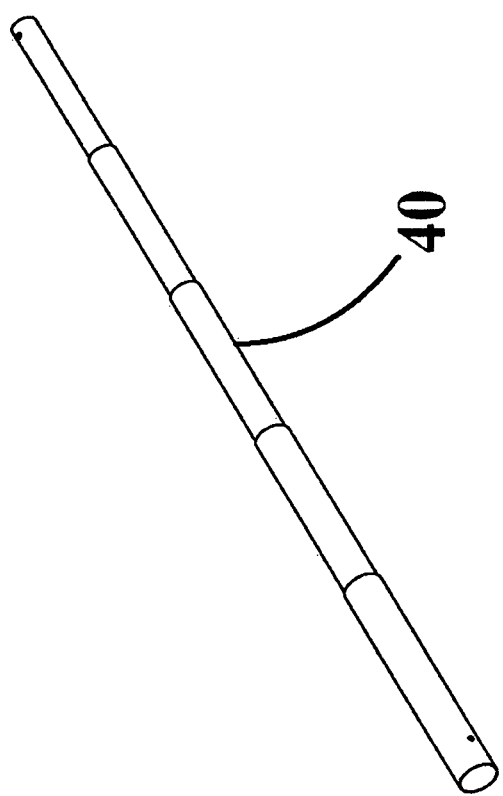
FIG. 9 illustrates telescoping wand

In the preferred embodiment the wand extends to 10 inches as shown in FIG. 9. The diameter of the wand increases in diameter from the bottom to the top end which allows for telescoping of the wand to various lengths. As the wand base is slid horizontally across the swivel assembly, the joint member is pushed downwardly and springs automatically upward into the aperture within the wand base to allow for 360 degree rotation.

Figure 15:
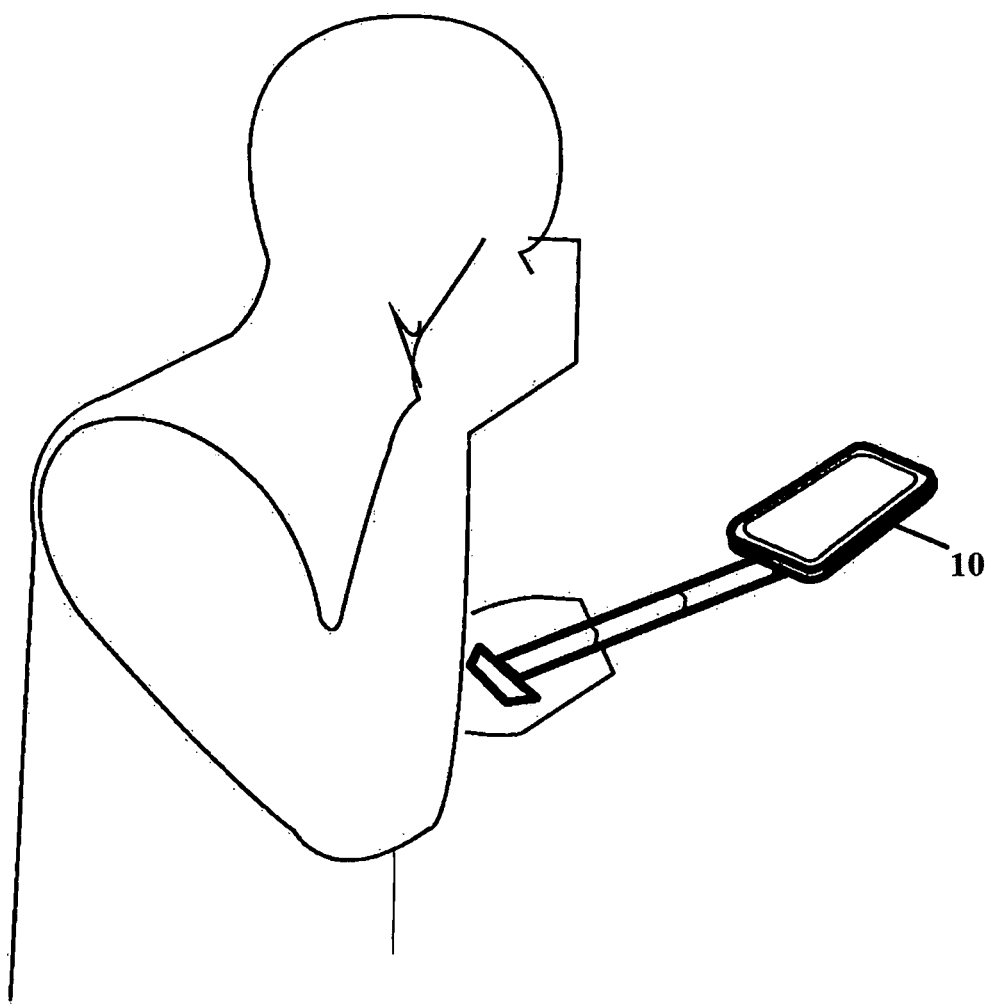
FIG. 15 illustrates present invention upon body of a person
Figure 16:
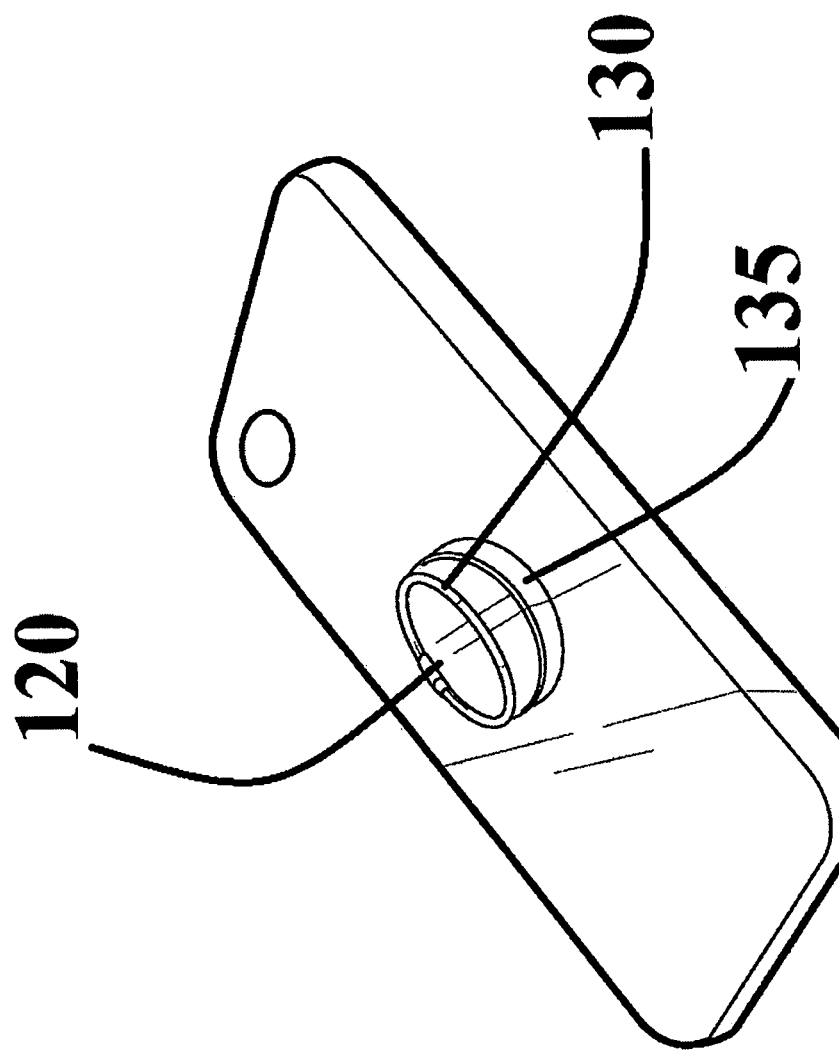
FIG. 16 illustrates ring attached to the back of the cell phone

As shown in FIG. 15 the Tecneksavr device (10), wherein a lower end of the rotatable wand is provided with a T-bar handle (20). In use, the lower section of the shaft can be extended linearly downward allowing the T-bar handle (20) to rest upon the chest or the stomach.

What is claimed is:

1. An ergonomic device used in combination with a cellular telephone, the device comprising:
    a base having an adhesive material for attachment to a backside of the cellular telephone;
    a swivel joint operationally formed atop and within the base and attached to the base with a rotatable connection and a hinged connection;
    the swivel joint and the base having a complementary shape;
    a wand laterally attached to the swivel joint;
    the rotatable connection allows the wand to rotate 360 degrees relative to the swivel joint;
    the swivel joint further comprising:
    an annular ring connected to the base;
    a cap member disposed atop the base;
    the cap member having a top wall with a circumferentially surrounding side wall;
    the surrounding side wall having a channel internally formed therein;
    the rotatable connection formed by the channel operatively engaging the annular ring
    wherein the cap member can rotate along the annular ring; and
    the hinged connection allows the wand to pivot backward and forward relative to the swivel joint from 30 degrees to 180 degrees.

2. The device of claim 1 wherein the wand is configured to telescope to various lengths.

3. The device of claim 1 wherein the wand diameter decreases in circumference.

4. The device of claim 1 wherein a T-shaped bar is attached to an opposite side of the wand.

5. The device of claim 1 wherein the device further comprises:
    a connector member that has a base with an adhesive material that attaches to the backside of the cellular telephone;
    the connector member configured to attach to the wand wherein it is held in place along the backside of the cellular telephone.

6. The device of claim 1 wherein the hinged connection is operatively connected to a section of the annular ring.

7. The device of claim 1 further comprises an end of the wand connected to the top wall of the cap member wherein the wand laterally extends therefrom.

8. An ergonomic device used in combination with a cellular telephone, the device comprising:
    a base having an adhesive material for attachment to a backside of the cellular telephone;
    a swivel joint operationally connected atop the base;
    a wand attached to the swivel joint;
    the swivel joint having a rotatable connection and a hinged connection;
    the rotatable connection allows the wand to rotate 360 degrees relative to the swivel joint; and
    the hinged connection allows the wand to pivot backward and forward relative to the swivel joint from 30 degrees to 180 degrees;
    the swivel joint further comprising:
    the base having a flat top side with a spring bias joint member operatively connected thereon;
    a plate connectable along the flat top side of the base;
    the plate with a central opening receiving the spring bias joint member;

the plate disposed atop the base;
the base and the plate having a complementary shape;
an attaching element hingedly connected to an edge of the plate;
an opening disposed within the attaching element for securely engaging an opposite side of the wand.

* * * * *